United States Patent
Hikichi

(10) Patent No.: US 12,316,616 B2
(45) Date of Patent: May 27, 2025

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Yukiyoshi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 259 days.

(21) Appl. No.: 17/720,526

(22) Filed: Apr. 14, 2022

(65) Prior Publication Data

US 2022/0353250 A1    Nov. 3, 2022

(30) Foreign Application Priority Data

Apr. 28, 2021 (JP) ................. 2021-076556

(51) Int. Cl.
*H04L 9/00* (2022.01)
*H04L 9/40* (2022.01)

(52) U.S. Cl.
CPC ...... *H04L 63/0435* (2013.01); *H04L 63/0236* (2013.01); *H04L 63/166* (2013.01); *H04L 63/20* (2013.01)

(58) Field of Classification Search
CPC ............. H04L 63/0435; H04L 63/0236; H04L 63/166; H04L 63/20; H04L 63/0823; H04L 63/164; H04L 63/0272
See application file for complete search history.

(56) References Cited

U.S. PATENT DOCUMENTS

2008/0137845 A1* 6/2008 Wood ............... H04L 63/164
  380/33
2012/0069379 A1* 3/2012 Tamura ........... H04N 1/00244
  358/1.14

FOREIGN PATENT DOCUMENTS

JP        2018110288 A  *  7/2018

* cited by examiner

*Primary Examiner* — Syed M Ahsan
(74) *Attorney, Agent, or Firm* — ROSSI, KIMMS & McDOWELL LLP

(57) ABSTRACT

An information processing apparatus configured to perform encryption communications using an encryption communication protocol set as a used protocol from among a plurality of encryption communication protocols The information processing apparatus sets a version of the encryption communication protocol to be used for the encryption communications in association with a specific communication destination, and executes, in a case that a communication partner is the specific communication destination and the set version of the encryption communication protocol includes a version of an encryption communication protocol set in the communication partner, the encryption communications with the communication partner using the version of the encryption communication protocol set in the communication partner.

11 Claims, 13 Drawing Sheets

F I G. 6A

| SERVER 7A92<br>172.23.224.201 | Idle | |
|---|---|---|
| Login | Server Print Pages | Contact |
| Jobs | Server Name<br>SERVER 7A92 | IP Address<br>172.23.224.201 |
| Info | Version number 1.0 | Total Memory<br>4096MB |
| Tools | | Disk Space<br>486GB (300GB Free) |
| Calibrate | Installed Options | |

F I G. 6B

| SERVER 7A92<br>172.23.224.201 | Idle | |
|---|---|---|
| Login | Server Print Pages | Contact |
| Jobs | Server | |
| | IT IS TCP COMMUNICATION ERROR<br><br>OK | |
| Calibrate | 486GB (300GB Free) | |
| | Installed Options | |

FIG. 8A

SETTING / REGISTRATION

< TLS SETTING >

LICENSE VERSION DESIGNATION

UPPER LIMIT VERSION    TLS 1.3 ▼ — 802

LOWER LIMIT VERSION    TLS 1.2 ▼ — 803

✕ CANCEL         OK ↵ — 804

STATUS CONFIRMATION  [2] A3  REMAINING SHEET AMOUNT IS SHORT.

FIG. 8B

SETTING / REGISTRATION

< TLS SETTING >

LICENSE VERSION DESIGNATION

UPPER LIMIT VERSION    TLS 1.2 ▼
                       TLS 1.3
                       TLS 1.2 — 805
LOWER LIMIT VERSION    TLS 1.1
                       TLS 1.0

✕ CANCEL         OK ↵ — 804

STATUS CONFIRMATION  [2] A3  REMAINING SHEET AMOUNT IS SHORT.

FIG. 9A

SETTING / REGISTRATION

< TLS SETTING >

SPECIFIC SERVER VERSION SETTING

| SPECIFIC SERVER HOST NAME | 10.255.255.1 ▼ | ~902 |
| USED VERSION | TLS 1.1 ▼ | ~903 |

[× CANCEL]   [OK ↵] ~904

STATUS CONFIRMATION  [2] A3  REMAINING SHEET AMOUNT IS SHORT.

FIG. 9B

SETTING / REGISTRATION

< TLS SETTING >

SPECIFIC SERVER VERSION SETTING

SPECIFIC SERVER HOST NAME   10.255.255.1   ~902

USED VERSION   TLS 1.1 ▼   ~903
- TLS 1.3
- TLS 1.2   ~905
- TLS 1.1
- TLS 1.0

[× CANCEL]   [OK ↵] ~904

STATUS CONFIRMATION  [2] A3  REMAINING SHEET AMOUNT IS SHORT.

us 12,316,616 B2

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

A multi-function peripheral (MFP) is known as an example of an image forming apparatus having not only a printing function but also functions such as a function of reading an original to convert the original into digital data, and storing the read data, print data received from a host, and the like. Such MFPs perform encryption communications when transmitting and receiving high secrecy data. For example, the encryption communications are used when browsing is performed using a web browser of the MFP. For such encryption communications, for example, an encryption communication protocol such as Transport Layer Security (TLS), Secure Sockets Layer (SSL), Security Architecture for the Internet Protocol (IPSec), or IEEE 802.1X is used. When performing the encryption communications, a user can select a desired protocol version from a plurality of protocol versions of the encryption communication protocol to be used, and set the protocol version in the MFP. In the MFP, a plurality of encryption algorithms for performing authentication processing, data encryption and decryption processing, and the like executed in the encryption communications are implemented, and the user can perform communications using these algorithms.

Japanese Patent Laid-Open No. 2018-110288 describes an information processing apparatus that performs encryption communications using encryption communication protocol set as the used protocol. Upon being instructed to change the used protocol from one encryption communication protocol to another encryption communication protocol, the information processing apparatus determines whether the encryption communications can be executed using the corresponding encryption algorithm. If it is determined that the encryption communications can be executed using the encryption algorithm, the protocol is changed as instructed, whereby the desired encryption algorithm and the protocol version can be appropriately set.

Unfortunately, with the technique described in Patent Document 1, only a single type of protocol version can be set. Thus, when a protocol version is set, communications with a web server using a different protocol version may fail to be performed.

SUMMARY OF THE INVENTION

An aspect of the present invention is to eliminate the above-mentioned problem with conventional technology.

A feature of the present invention is to provide a technique enabling encryption communications to be performed with a plurality of communication destinations using different encryption communication protocol versions without compromising the secrecy of communication data.

According to a first aspect of the present invention, there is provided an information processing apparatus configured to perform encryption communications using an encryption communication protocol set as a used protocol from among a plurality of encryption communication protocols, the information processing apparatus comprising, at least one processor and at least one memory being configured to: set a version of the encryption communication protocol to be used for the encryption communications in association with a specific communication destination; and execute, in a case that a communication partner is the specific communication destination and the set version of the encryption communication protocol includes a version of an encryption communication protocol set in the communication partner, the encryption communications with the communication partner using the version of the encryption communication protocol set in the communication partner.

According to a second aspect of the present invention, there is provided a method of controlling an information processing apparatus configured to perform encryption communications using an encryption communication protocol set as a used protocol from among a plurality of encryption communication protocols, the method comprising: setting a version of the encryption communication protocol used for the encryption communications in association with a specific communication destination; and executing, in a case that a communication partner is the specific communication destination and the set version of the encryption communication protocol includes a version of an encryption communication protocol set in the communication partner, the encryption communications with the communication partner using the version of the encryption communication protocol set in the communication partner.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A and FIG. 6B are diagrams illustrating an example of an operation screen of an external controller displayed on the console panel of the MFP according to the embodiment;

FIG. 8A and FIG. 8B are diagrams illustrating an example of a version setting screen displayed on the console panel of the MFP according to the embodiment;

FIG. 9A and FIG. 9B are diagrams illustrating an example of a specific server version setting screen displayed on the console panel of the MFP according to the embodiment;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that in an embodiment, an information processing apparatus of the present invention is described in an example where the information processing apparatus is applied to a multi-function peripheral (MFP), but the present invention is not limited to MFPs, and may be applied to information processing apparatuses that can perform encryption communications, such as a personal computer (PC).

Figure 1:
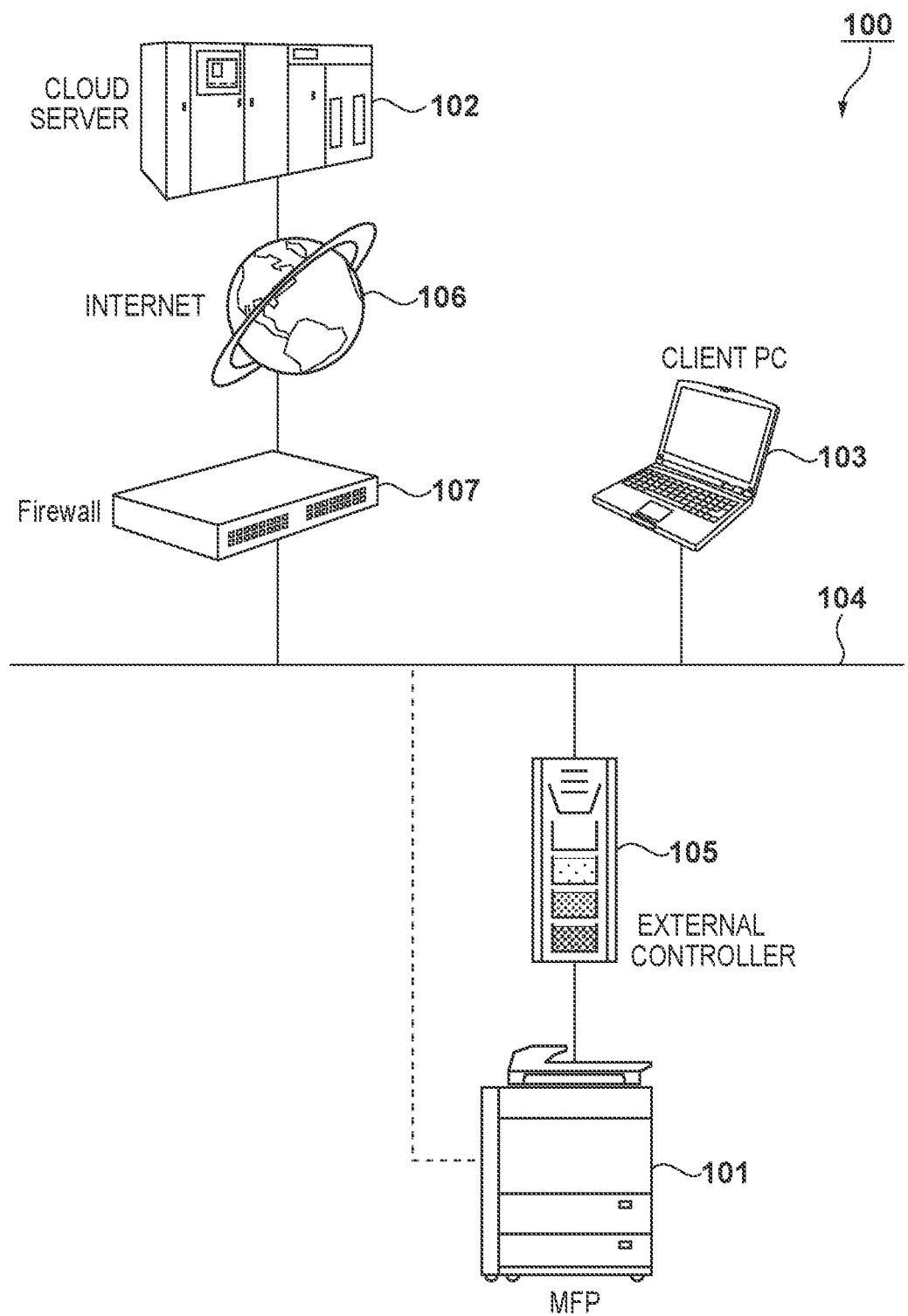
FIG. 1 is a diagram schematically illustrating a configuration of a communication system including an MFP according to an embodiment of the present invention.

FIG. 1 is a diagram schematically illustrating a configuration of a communication system 100 including an MFP 101 according to an embodiment of the present invention.

The communication system 100 includes the MFP 101, a cloud server 102, a client PC 103, and an external controller 105. The client PC 103 and the external controller 105 are communicatively connected to each other over a network 104. The cloud server 102 on the Internet 106 is connected to the network 104 via a firewall 107. The MFP 101 is connected to the network 104 via the external controller 105, and can communicate with devices on the network. Note that, as indicated by the dashed line in FIG. 1, there is also a mode in which the MFP 101 has a second network line to be connected directly to the network 104, and not via the external controller 105.

A plurality of applications operate on the cloud server 102. The service provided by the applications includes a cloud print service with which a print job is stored in the server 102, to be usable for printing by any authenticated MFP. There is also a file conversion service with which data scanned by the MFP is converted into a file format such as Word (trade name) or Excel (trade name). Furthermore, there is an image log management service with which the content printed by the MFP is stored in a form of a log, to enable tracking of output products.

The external controller 105 also provides a plurality of services. Such services include a print service with which a print job received from the client PC 103 is output by the MFP 101 as a print product, and a print job composition and imposition process service. Furthermore, there is a calibration function for performing adjustment, on a plurality of types of sheets, to achieve a desired tint.

The MFP 101 has a printing function, a scanning function, and a communication function. The MFP 101 transmits image data and the like to the cloud server 102 to make the cloud server 102 hold the image data, or performs printing based on print data received from the client PC 103, for example. In the embodiment, the cloud server 102 functions as a TLS server, and the MFP 101 performs encryption communications with the cloud server 102 using the TLS. The MFP 101 can function as a TLS server for the client PC 103. The MFP 101 can perform TLS communications with the client PC 103. Note that the communication protocol is not limited to TLS. Furthermore, the external controller 105 can function as a TLS server and perform TLS communications with the web browser installed in the MFP 101.

The MFP 101 performs encryption communications when transmitting and receiving high secrecy data. In the encryption communications, data encryption and decryption processing and communication destination authentication processing are performed. The MFP 101 performs the encryption communications using encryption communication protocol such as TLS and IPSec. In the embodiment, as an example of a case is described where the MFP 101 performs TLS based encryption communications using TLS as the encryption communication protocol (hereinafter, referred to as TLS communication). The protocol version for TLS includes TLS1.0, TLS1.1, TLS1.2, and TLS1.3. It is assumed that the MFP 101 according to the embodiment can use any of the protocol versions TLS1.0 to TLS1.3 described above.

Hereinafter, the protocol version of the encryption communication protocol usable by communication software implemented in the MFP 101 is referred to as an implemented protocol version. The MFP 101 also includes a plurality of encryption algorithms that can be used for performing TLS communications. The plurality of encryption algorithms include an encryption algorithm for performing data encryption and decryption (hereinafter, referred to as encryption algorithm), and an encryption algorithm for managing an encryption key used in the data encryption/decryption processing and for performing authentication processing on a communication destination by issuing a certificate (hereinafter, referred to as authentication algorithm). The MFP 101 includes, as the encryption algorithm, ChaCha20-Poly1305, AES-GCM, AES-CBC, and 3DES-CBC. Each AES-GCM and AES-CBC are further classified into two types based on the length of the encryption key (key length) used in the encryption and decryption processing. The encryption algorithm implemented in the MFP 101 is defined as an implemented encryption algorithm below. The MFP 101 further includes, as the authentication algorithm, ECDSA, RSA, and DSA that are defined as an implemented authentication algorithm below.

The implemented authentication algorithm can be set independently from the implemented protocol version. In the present embodiment, a description is given mainly using the protocol version. The authentication algorithm is not an essential element of the embodiment, and thus the description thereof will be omitted below.

Figure 2:
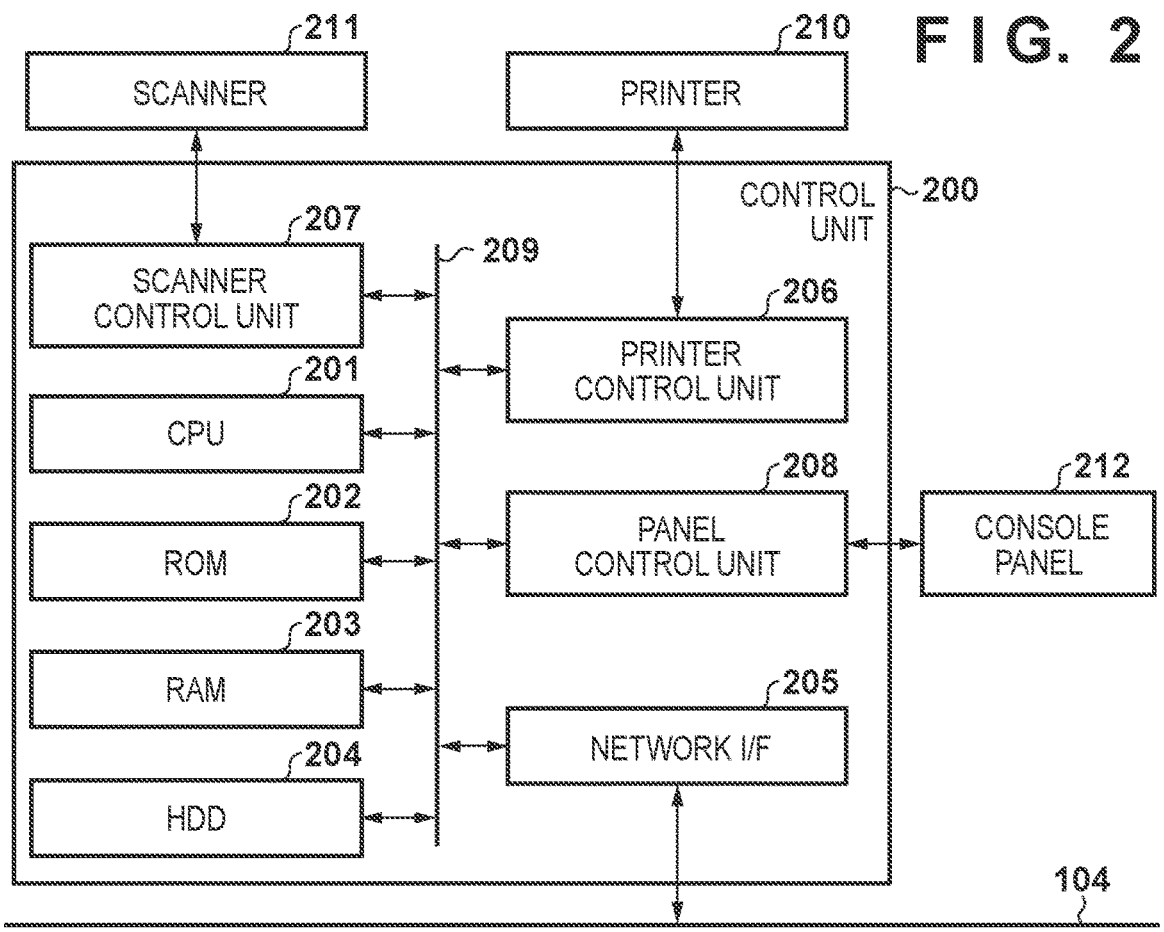
FIG. 2 is a block diagram for describing a hardware configuration of the MFP according to the embodiment.

FIG. 2 is a block diagram for describing a hardware configuration of the MFP 101 according to the embodiment.

The MFP 101 includes a control unit 200, a printer 210, a scanner 211, and a console panel 212. The control unit 200 is connected to each of the printer 210, the scanner 211, and the console panel 212. The control unit 200 includes a CPU 201, a ROM 202, a RAM 203, an HDD 204, a network interface (I/F) 205, a printer control unit 206, a scanner control unit 207, and a panel control unit 208. The CPU 201, the ROM 202, the RAM 203, the HDD 204, the network I/F 205, the printer control unit 206, the scanner control unit 207, and the panel control unit 208 are connected to each other via a system bus 209. The control unit 200 controls the printer 210, the scanner 211, and the console panel 212.

The CPU 201 deploys a program, stored in the ROM 202 and the HDD 204, on the RAM 203, and executes the program thus deployed to implement functions of software modules in FIG. 3 described later, and executes various types of processing. The ROM 202 stores a boot program and each setting data of the MFP 101. The RAM 203 is used as a program deployed area and a work area of the CPU 201, and is used as a temporary storage area for various types of data. The HDD 204 stores a program and data pieces such as print data. For example, the RAM 203 and the HDD 204 store usable version information (used protocol), usable algorithm information, key pair information, and the like described later. The network I/F 205 performs data communications with an external device (not illustrated) connected to the network 104. The printer control unit 206 controls execution of print processing by the printer 210. The scanner control unit 207 controls execution of scan processing by the scanner 211. The panel control unit 208 performs display control on the console panel 212 and receives input information input on the console panel 212. The printer 210 performs printing on printing paper (sheet) based on the print data acquired from the client PC 103 or the like, or the image data obtained by the scanner 211 by reading an original. The scanner 211 reads an original placed on a platen (not illustrated), and generates image data based on the result of the reading. The console panel 212 displays a setting screen or the like on which settings of the MFP 101 are made.

Figure 3:
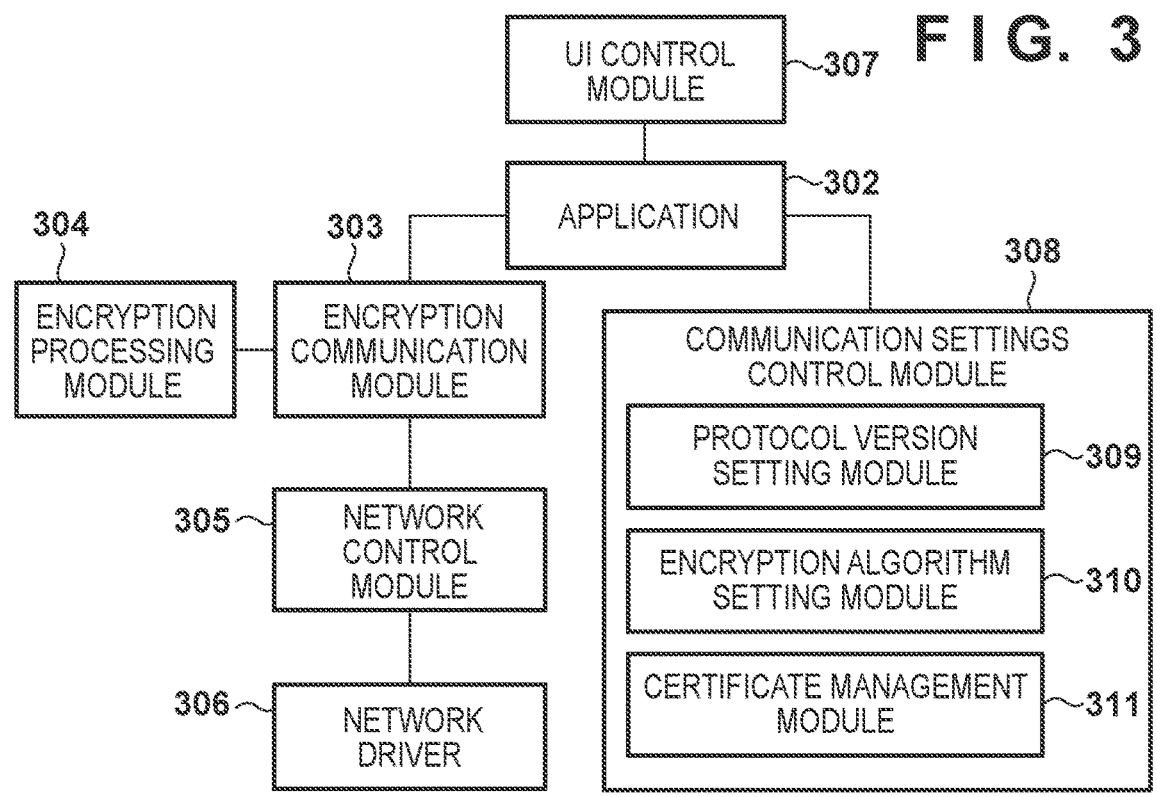
FIG. 3 is a block diagram for describing a configuration of software modules of the MFP according to the embodiment.

FIG. 3 is a block diagram for describing a configuration of software modules of the MFP 101 according to the embodiment.

The software modules include an application 302, an encryption communication module 303, an encryption processing module 304, and a network control module 305. The software modules further include a network driver 306, a UI control module 307, and a communication settings control module 308. The communication settings control module 308 includes a protocol version setting module 309, an encryption algorithm setting module 310, and a certificate managing module 311.

The application 302 is a module for implementing the printing function, the scanning function, the communication function, and the like in the MFP 101. For example, the application 302 instructs the encryption communication module 303 to execute TLS communications when high secrecy data communication processing is performed.

Based on the instruction to execute the encryption communications, the encryption communication module 303 controls the execution of the encryption communications. For example, the encryption communication module 303 obtains each information required for executing TLS communications from the encryption processing module 304, and the certificate managing module 311 of the communication settings control module 308. The encryption communication module 303 also instructs the network control module 305 to execute data communication. The encryption processing module 304 generates and verifies each data used for the encryption communications. For example, the encryption processing module 304 generates and verifies a signature for authentication for the TLS communication, and a hash value for detecting data falsification. The encryption processing module 304 further generates an encryption key for performing data encryption and decryption, and performs the data encryption and decryption processing.

The network control module 305 controls a communication protocol such as TCP/IP and instructs the network driver 306 to execute data communications. The network driver 306 controls the network I/F 205 and controls the data communications with an external device (not illustrated) connected to the network 104.

The application 302 further controls the panel control unit 208 via the UI control module 307, to control display on the console panel 212 and control reception of input information input through an operation on the console panel 212. For example, the UI control module 307 receives a change instruction for setting information (hereinafter, TLS communication setting information) related to the TLS communications, issued by the user by operating the console panel 212. This TLS communication setting information includes license version information, license algorithm information, and key pair information. The license version information is information indicating a protocol version permitted to be used, among the implemented protocol versions of the MFP 101, and has any of the implemented protocol versions set in advance as an initial value in an initial state of the MFP 101. The license algorithm information is information indicating an encryption algorithm permitted to be used, among the implemented encryption algorithms of the MFP 101, and has any of the implemented encryption algorithms set in advance as an initial value in the initial state of the MFP 101. Upon receiving the change instruction for the TLS communication setting information, the UI control module 307 notifies the communication settings control module 308 of change instruction information including a change content and the like, via the application 302.

The communication settings control module 308 manages the TLS communication setting information, and the TLS communication setting information is stored in the RAM 203 or the HDD 204. The communication settings control module 308 changes the TLS communication setting information based on the change instruction information, for the TLS setting configuration information, received from the UI control module 307. Specifically, the communication settings control module 308 uses the protocol version setting module 309 to change the stored license version information to protocol version information (hereinafter, referred to as change instruction version information) corresponding to the change instruction information. The communication settings control module 308 uses the encryption algorithm setting module 310 to change stored license algorithm information to encryption algorithm information (hereinafter, change instruction algorithm information) corresponding to the change instruction information. Furthermore, the communication settings control module 308 uses the certificate managing module 311 to change the key pair information to setting information on the authentication algorithm corresponding to the change instruction information (hereinafter, change instruction authentication setting information).

Figure 14:
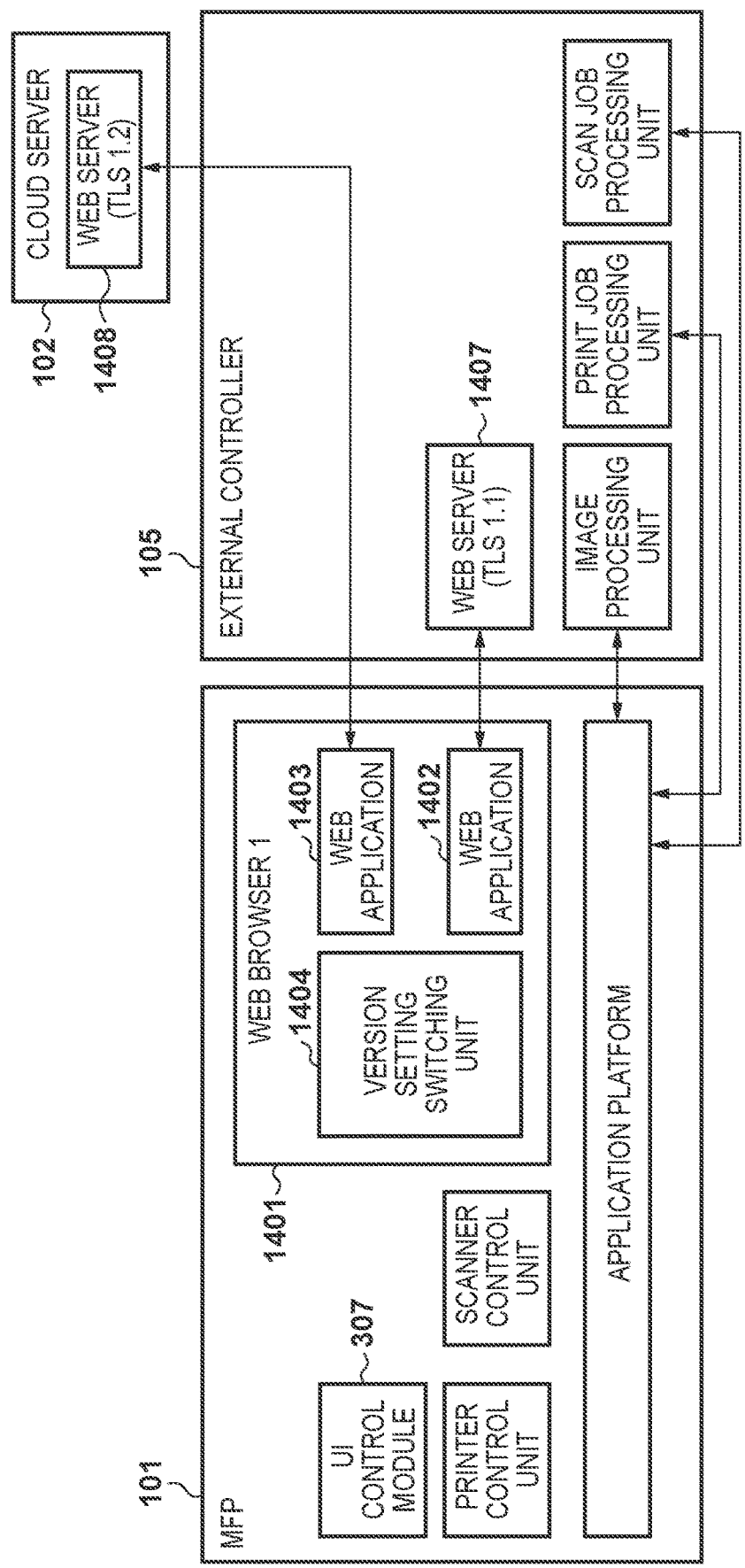
FIG. 14 is a functional block diagram schematically illustrating functions of the MFP according to the embodiment.

FIG. 14 is a functional block diagram schematically illustrating functions of the MFP 101 according to the embodiment.

To use a service provided by the cloud server 102 or the external controller 105, the user of the MFP 101 uses a web browser 1401 installed in the MFP 101. With this web browser 1401, a screen operation for using the service can be performed, and a result of the service executed in the server displayed can be viewed. The web browser 1401 generates web applications 1402 and 1403 for each connection destination, and switches the TLS communication protocol version for each connected server. This switching is performed by a version setting switching unit 1404, and for example, TLS1.2 is designated for connecting to a web server 1408 of the cloud server 102. Furthermore, TLS1.1 is designated for connecting with a web server 1407 of the external controller 105. Note that the function block diagram of the MFP is not limited to the configuration in FIG. 14, and may be of other modes.

Figure 15:
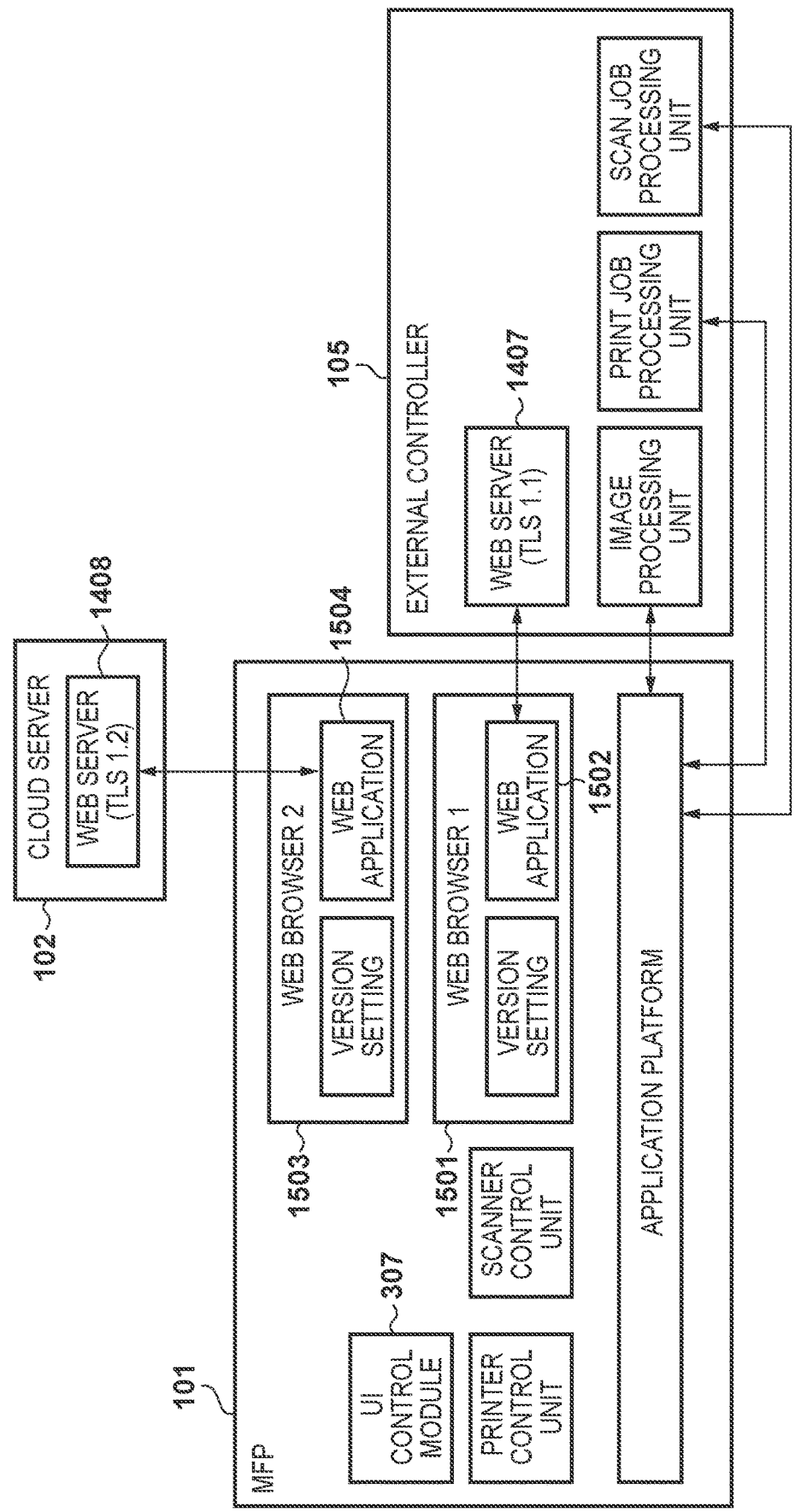
FIG. 15 is a block diagram illustrating another functional configuration of the MFP according to the embodiment.

FIG. 15 is a block diagram illustrating another functional configuration of the MFP 101 according to the embodiment. Note that, in FIG. 15, components that are common to FIG. 14 are denoted by the same reference numerals, and the description thereof will be omitted.

FIG. 15 is different from FIG. 14 in that the cloud server 102 directly communicates with the MFP 101, instead of being connected thereto via the external controller 105. The MFP 101 includes a web browser 1503 for communicating with the cloud server 102 and a web browser 1501 for communicating with the external controller 105 that are individual browsers. The web browsers 1501 and 1503 respectively generate web applications 1502 and 1504. Each web browser holds a TLS version setting value, and the web browser 1501 can communicate with the web server 1407 using TLS1.1, and the web browser 1503 can communicate with the web server 1408 using TLS1.2.

Next, examples of display on an operation screen displayed on the console panel 212 of the MFP 101 will be described.

Figure 4:
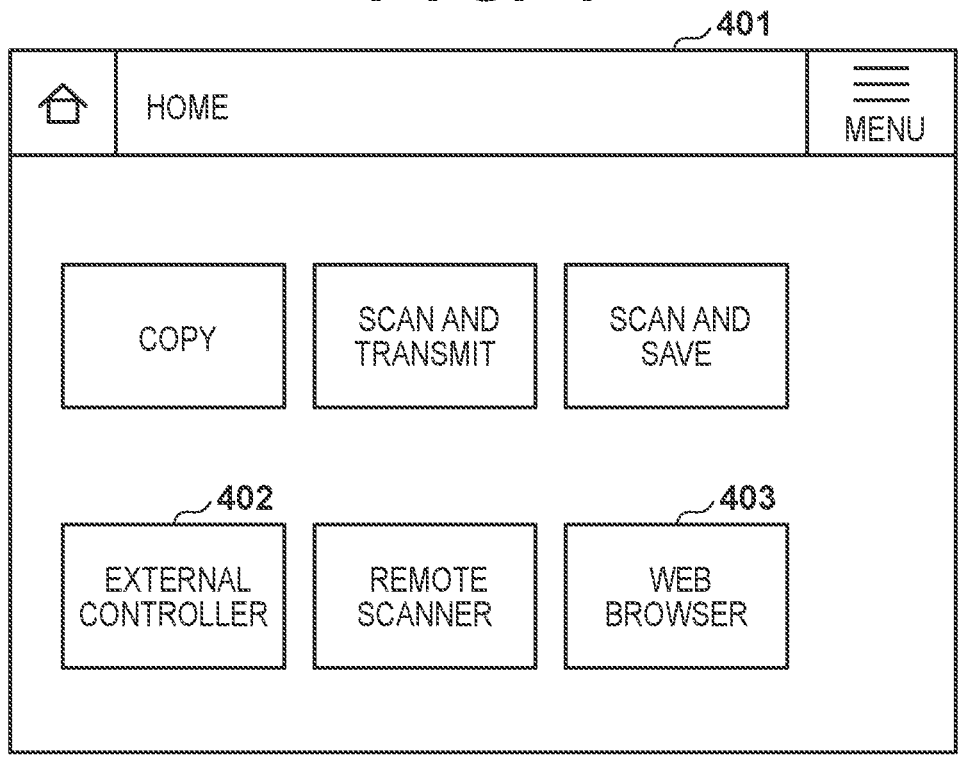
FIG. 4 is a diagram illustrating an example of a home screen displayed on a console panel of the MFP according to the embodiment.

FIG. 4 is a diagram illustrating an example of a home screen displayed on the console panel 212 of the MFP 101 according to the embodiment.

This home screen 401 is initially displayed when the MFP 101 is turned ON. The home screen 401 displays buttons corresponding to a plurality of functions of the MFP 101. For example, a web browser button 403 is a button for viewing a web page provided by the cloud server 102. An external controller button 402 is a button for operating the external controller 105.

Figure 5:
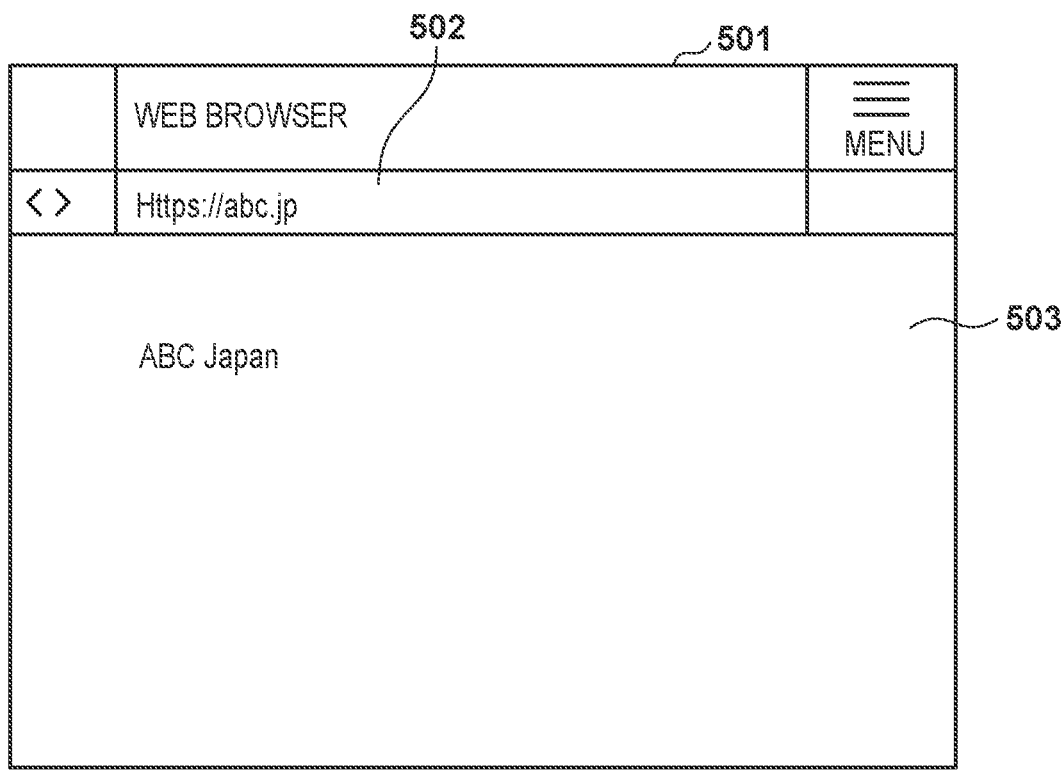
FIG. 5 is a diagram illustrating an example of a web browser screen displayed when a web browser button on the screen illustrated in FIG. 4 is pressed.

FIG. 5 is a diagram illustrating an example of a web browser screen displayed when the web browser button 403 on the screen illustrated in FIG. 4 is pressed.

This web browser screen 501 includes a URL input field 502 for the web server to be displayed, and a content display field 503 on which the content received through the encryption communication module 303 is displayed.

FIG. 6A is a diagram illustrating an example of an operation screen of the external controller 105 displayed when the external controller button 402 on the screen illustrated in FIG. 4 is pressed.

This external controller operation screen 601 displays a host name and an IP address of the external controller 105, in a top portion of the screen. A menu area 602 from which a list of jobs can be displayed and color calibration can be executed is provided on the left side of the screen. When an item in the menu area 602 is selected, a setting value of the external controller 105 is displayed on a content display area 603, and data input is enabled. The external controller operation screen 601 is realized by processing that is the same as that for the web browser illustrated in FIG. 14 inside the MFP 101. The external controller 105 includes the web server 1407 therein. The UI control module 307 can operate the external controller 105 by using a web application of the external controller 105 via the encryption communication module 303. Here, to prevent leakage of communication information, the TLS communications are employed for the network communications between the external controller 105 and the MFP 101. If there is any error in the TLS communications, a communication error dialog 604 as illustrated in FIG. 6B is displayed to alert the user's attention.

Next, an example of an operation screen displayed for the TLS communication setting and the encryption algorithm setting will be described.

Figure 7:
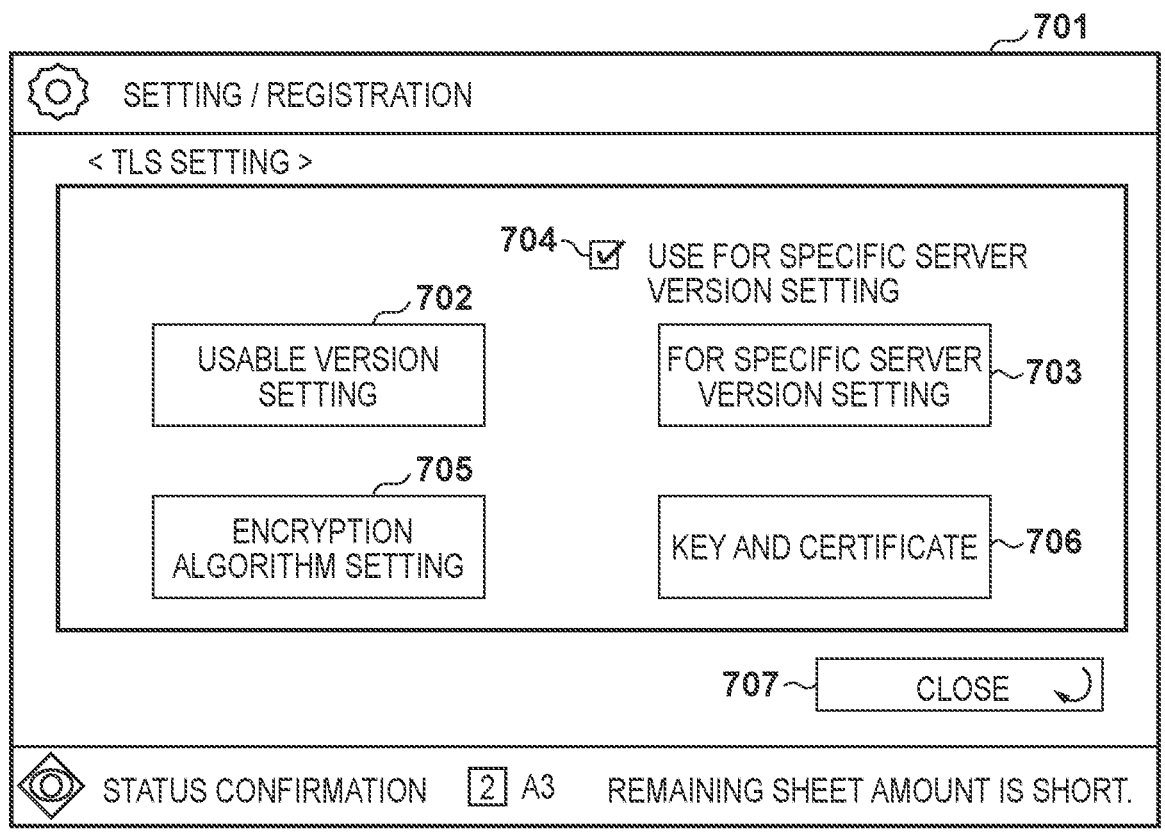
FIG. 7 is a diagram illustrating an example of a TLS setting screen displayed on the console panel, when a change instruction for TLS communication setting information is issued in the MFP according to the embodiment.

FIG. 7 is a diagram illustrating an example of a TLS setting screen 701 displayed on the console panel 212, when the change instruction for the TLS communication setting information is issued in the MFP 101 according to the embodiment.

The TLS setting screen 701 includes a usable version setting button 702, a version setting button 703 for a specific server, a check box 704, an encryption algorithm setting button 705, a key and certificate button 706, and a close button 707.

The usable version setting button 702 is a setting button select for issuing the change instruction for the license version information. The version setting button 703 for a specific server is a button selected for issuing the change instruction for the license version information on a specific server. The user can check the check box 704 to switch the protocol version for the specific server. The encryption algorithm setting button 705 is a button selected for issuing the change instruction for the license algorithm information. The encryption algorithm used for data encryption can be set independently from the TLS protocol version. The key and certificate button 706 is a button selected for issuing the change instruction for the key pair information. The functions of the encryption algorithm setting button 705 and the key and certificate button 706 are not so directly related with the operation of the present embodiment, and thus will be omitted in the description below. The close button 707 is a button for terminating the TLS setting.

FIG. 8A is a diagram illustrating an example of a version setting screen 801 displayed on the console panel 212 of the MFP 101 when the usable version setting button 702 is selected on the screen of FIG. 7.

The version setting screen 801 is a screen for issuing the change instruction for the license version information. This version setting screen 801 includes an upper limit version 802, a lower limit version 803, and an OK button 804. As the upper limit version 802 and the lower limit version 803, setting values, corresponding to the license version information stored in the RAM 203 or the HDD 204, are set and displayed. The upper limit version 802 indicates the upper limit value of the license version information and the lower limit version 803 indicates the lower limit value of the license version information.

In the embodiment, it is assumed that 1.0, 1.1, 1.2, and 1.3 are selectable as the TLS version. The user can designate the upper limit and the lower limit of the TLS version used, on this screen. The setting values of the upper limit version 802 and the lower limit version 803 can be set by operating a pull down menu. The upper limit version 802 is, for example, set through an operation on a pull down menu 805 in FIG. 8B by the user. The OK button 804 is a button for confirming the setting on the version setting screen 801, and issuing the change instruction for the license version information. FIG. 8A illustrates an example where relatively new versions are used, with the upper limit version set to be TLS1.3, and the lower limit version set to be TLS1.2.

It is preferable that all the servers and clients start supporting a new version of the TLS communication at once. Unfortunately, the new version support start timing may vary due to situations of their manufacturers or the like. In particular, with devices used for particular applications, such as the external controller 105, there may be cases where support for past products is difficult to be implemented concurrently with general web servers. In such a case, a situation occurs where the optimal TLS protocol version varies among servers. In view of this, the version setting for a specific server and the check box 704 for determining whether to use the setting are provided on the TLS setting screen 701 in FIG. 7 of the embodiment.

FIG. 9A is a diagram illustrating an example of a version setting screen 901 for a specific server displayed on the console panel 212, when the version setting button 703 for a specific server is pressed with the check box 704 checked.

This screen 901 is a screen for issuing the change instruction for the license version information for a specific server. This screen 901 is different from the screen 801 in FIG. 8A in that a host name field 902 and a used version field 903 for the specific server are added. In the embodiment, when the MFP 101 performs the TLS communications with the external controller 105, the external controller 105 is designated as the specific server. Thus, an IP address "10.255.255.1" that is a fixed value in the MFP 101 is input in the specific server host name field 902.

With the used version field 903, a TLS protocol version used for the communications with the specific server can be designated. In the present embodiment, only one such field is provided because the TLS version for the specific server is known. If necessary, the upper limit and the lower limit versions may be provided as illustrated in FIG. 8A. When the MFP 101 performs the TLS communications with the external controller 105, the value of the TLS protocol version set on the specific server version setting screen 901 is used. In the present embodiment, the external controller 105 does not yet support a version TLS1.2 and after. Thus, "TLS1.1" is set in the used version field 903.

To change the used version, a desired version may be selected from a pull down menu 905 displaying a list of versions as illustrated in FIG. 9B for example. The setting value is updated when an OK button 904 is pressed after the input value has been confirmed.

Figure 10:
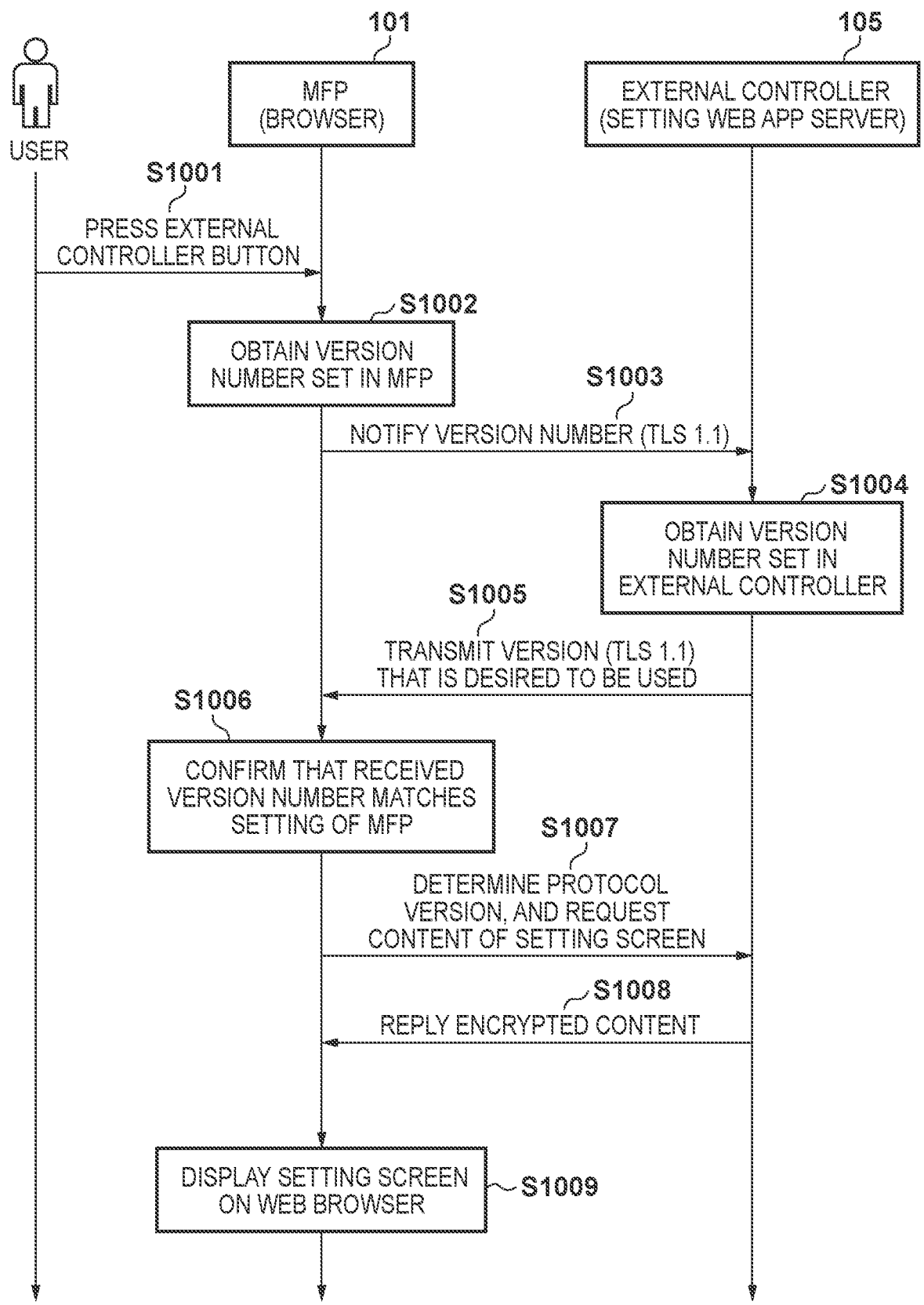
FIG. 10 is a sequence diagram for describing a procedure of encryption communication processing performed by the MFP according to the embodiment with the external controller.

Note that, as described above with reference to FIG. 15, when the MFP 101 includes a plurality of network interfaces, a device that can be set to be the specific server may be limited to a device connected to one of the plurality of network interfaces. Furthermore, the external controller 105 may be provided with identification information (for example, a vendor ID) indicating a device, and the device that can be set to be the specific server may be limited to a device having the corresponding identification information. Thus, a method of preventing a security hole being created by limiting the device settable to be the specific server is also available FIG. 10 is a sequence diagram illustrating a procedure of encryption communication processing performed by the MFP 101 according to the embodiment with the external controller 105. Note that, in FIG. 10, the processing of the MFP 101 is performed by the functional modules of the functional software modules (FIG. 3) realized by the CPU 201 of the MFP 101 by deploying and executing the program, stored in a storage unit such as the HDD 204 or the ROM 202, on the RAM 203.

First of all, in step S1001, the CPU 201 functions as the UI control module 307, and receives an instruction issued from the user by pressing the external controller button 402 in FIG. 4. Then, in step S1002, the CPU 201 functions as the communication settings control module 308, and obtains the upper and the lower limit values of the TLS version set in the MFP 101 as described above with reference to FIG. 8A and the encryption information. Then, in step S1003, the application 302 notifies the external controller 105 of the values thus obtained, through the encryption communication module 303 and via the network control module 305. In response to this, the external controller 105 obtains, in step S1004, the TLS version and the encryption information set to the external controller 105. In step S1005, the application 302 receives the TLS version number and encryption method that are desired to be used by the external controller 105, from the external controller 105.

Then, in step S1006, the CPU 201 functions as the communication settings control module 308, and determines whether communications can be performed using the TLS version number of which has been received from the external controller 105. A method of thus determining whether the communications can be performed will be described later with reference to FIG. 13. In the example illustrated in FIG. 10, the TLS version 1.1 received is within a range defined by the upper and the lower limit versions of the MFP 101. Thus, it is determined that the communications can be performed thereafter using the encryption method received in the form of TLS1.1. Then, in step S1007, the application 302 requests the external controller 105 for transmission of a content of the setting screen of the external controller 105, using the TLS version 1.1. In step S1008, the encryption communication module 303 receives the encrypted content from the external controller 105. Finally, in step S1009, the application 302 uses the UI control module 307 to display the received content on the console panel 212 using the web browser. An example of the content thus displayed by the web browser is illustrated in FIG. 6A.

Figure 11:
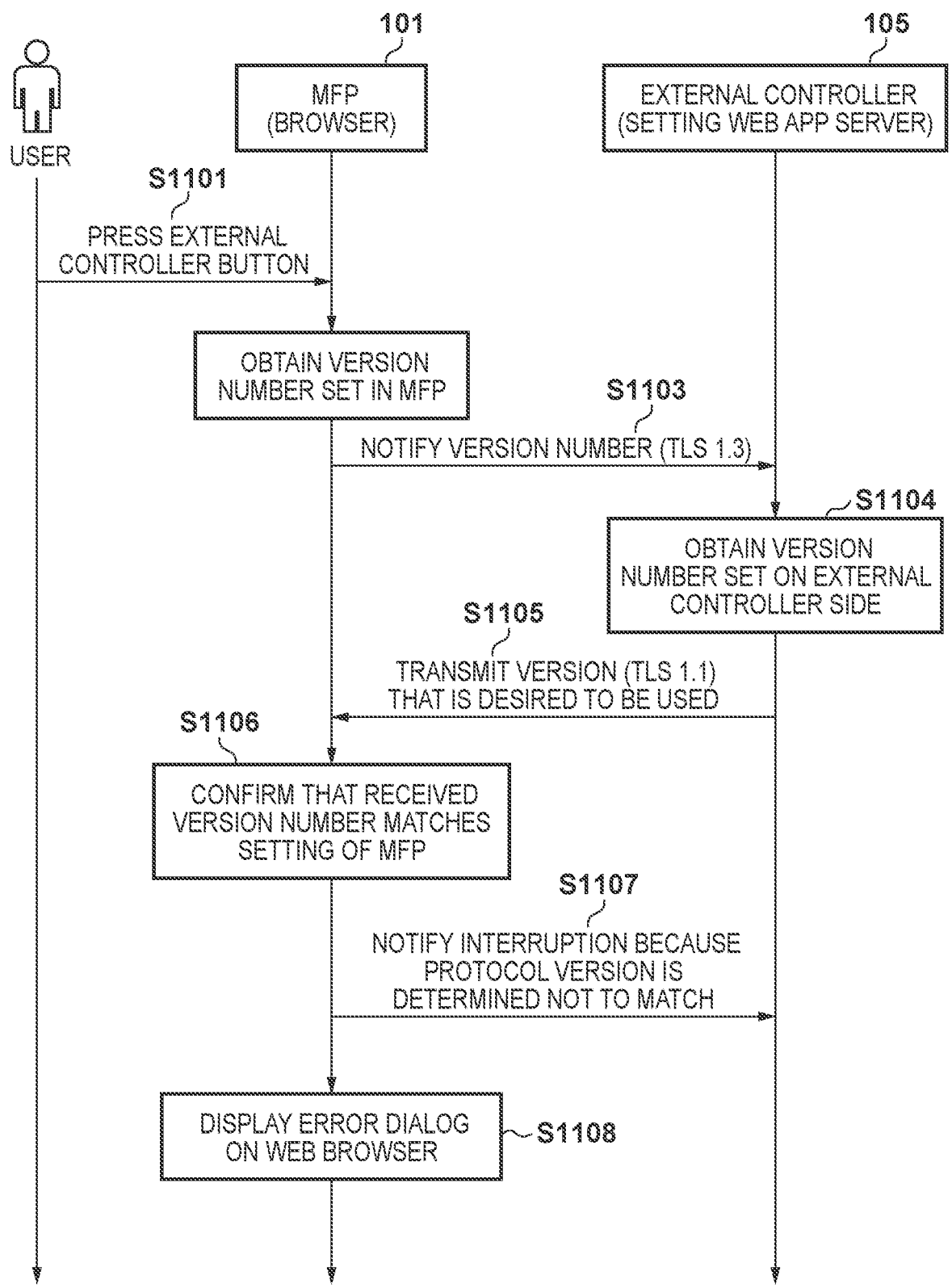
FIG. 11 is a sequence diagram for describing a procedure of encryption communication processing performed by the MFP according to the embodiment with the external controller.

FIG. 11 is a sequence diagram illustrating a procedure of encryption communication processing performed by the MFP 101 according to the embodiment with the external controller 105. Note that, in FIG. 11, the processing performed by the MFP 101 is performed by the functional modules of the functional software modules realized by the CPU 201 of the MFP 101 by deploying, on the RAM 203, and executing the program, stored in a storage unit such as the HDD 204 or the ROM 202.

The basic sequence herein is the same as that in FIG. 10. Here, a description is given on a case where the TLS communication fails when the license version illustrated in FIG. 8A is commonly applied to all the servers, with the specific server version setting check box 704 in FIG. 7 not checked. Specifically, a case is described where the upper limit version and the lower limit version of the MFP 101 are respectively set to TLS1.3 and TLS1.2, and the same setting is applied to the encryption communications with the external controller 105. The contents of step S1101 to step S1105 in FIG. 11 are the same as those of step S1001 to step S1005 in FIG. 10, and thus descriptions thereof will be omitted.

Then, in step S1106, the CPU 201 functions as the communication settings control module 308, and determines whether communications can be performed using the TLS version number of which has been received from the external controller 105. In the example illustrated in FIG. 11, the TLS version 1.1 received is not included within the range defined by the upper limit version 1.3 and the lower limit version 1.2 of the MFP 101. Thus, the protocol version is determined not to match in step S1106. Then, in step S1107, the application 302 notifies the external controller 105 of interruption of the TLS communications, by using the encryption communication module 303. Then, in step S1108, the CPU 201 functions as the UI control module 307, and displays the communication error dialog 604 illustrated in FIG. 6B, for example, on the console panel 212 to present to the user that a failure of the encryption communications has occurred with the external controller 105.

Figure 12:
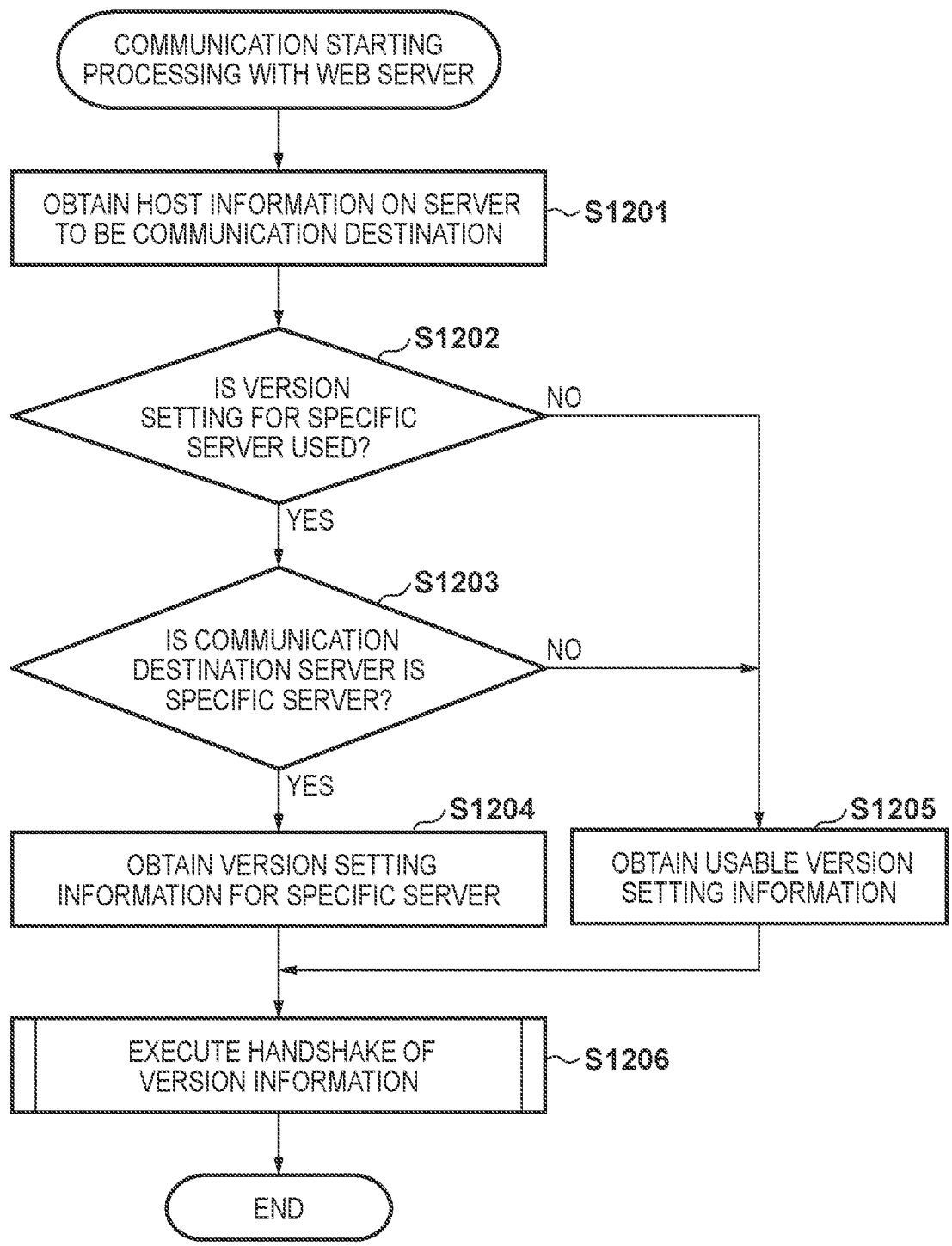
FIG. 12 is a flowchart for describing a procedure at the start of communications for the encryption communication processing performed by the MFP according to the embodiment.

FIG. 12 is a flowchart for describing a procedure at the start of communications for the encryption communication processing performed by the MFP 101 according to the embodiment. Processing illustrated in this flowchart is realized by the CPU 201 of the MFP 101 deploying, on the RAM 203, and executing the program stored in the storage unit such as the HDD 204 or the ROM 202.

First of all, in step S1201, the CPU 201 functions as the communication settings control module 308, and obtains host information on a server to be the communication destination. Then, the CPU 201 functions as the UI control module 307, and determines which server is to be the communication destination, depending on which button on the home screen 401 has been pressed by the user. Then, in step S1202, the CPU 201 functions as the communication settings control module 308, and determines whether the check box 704 on the TLS setting screen 701 is checked. When the check box 704 is not checked, it means that the same setting for the TLS version is used for all the servers, and the processing proceeds to step S1205. On the other hand, when the check box 704 is checked, the processing proceeds to step S1203, where the CPU 201 functions as the communication settings control module 308 to determine whether the communication destination server is the specific server. When the communication destination is the specific server, the processing proceeds to step S1204, where the CPU 201 obtains the used TLS version for the specific server illustrated in FIG. 9A, and then the processing proceeds to step S1206. On the other hand, when the communication destination is determined not to be the specific server in step S1203, the processing proceeds to step S1205 where the CPU 201 obtains the upper and the lower limit values of the TLS version illustrated in FIG. 8A, and then the processing proceeds to step S1206. In step S1206, the CPU 201 executes handshake for the encryption communications with the external controller 105 based on the version information obtained in step S1204 or step S1205, and then terminates this processing. Note that the details of the encryption communications handshake are the same as the contents that have already been described with reference to the sequence diagrams in FIG. 10 and FIG. 11.

With this processing, when a version for the specific server is set and the communication destination is the specific server, communications can be performed with the specific server using the version set for the specific server.

Figure 13:
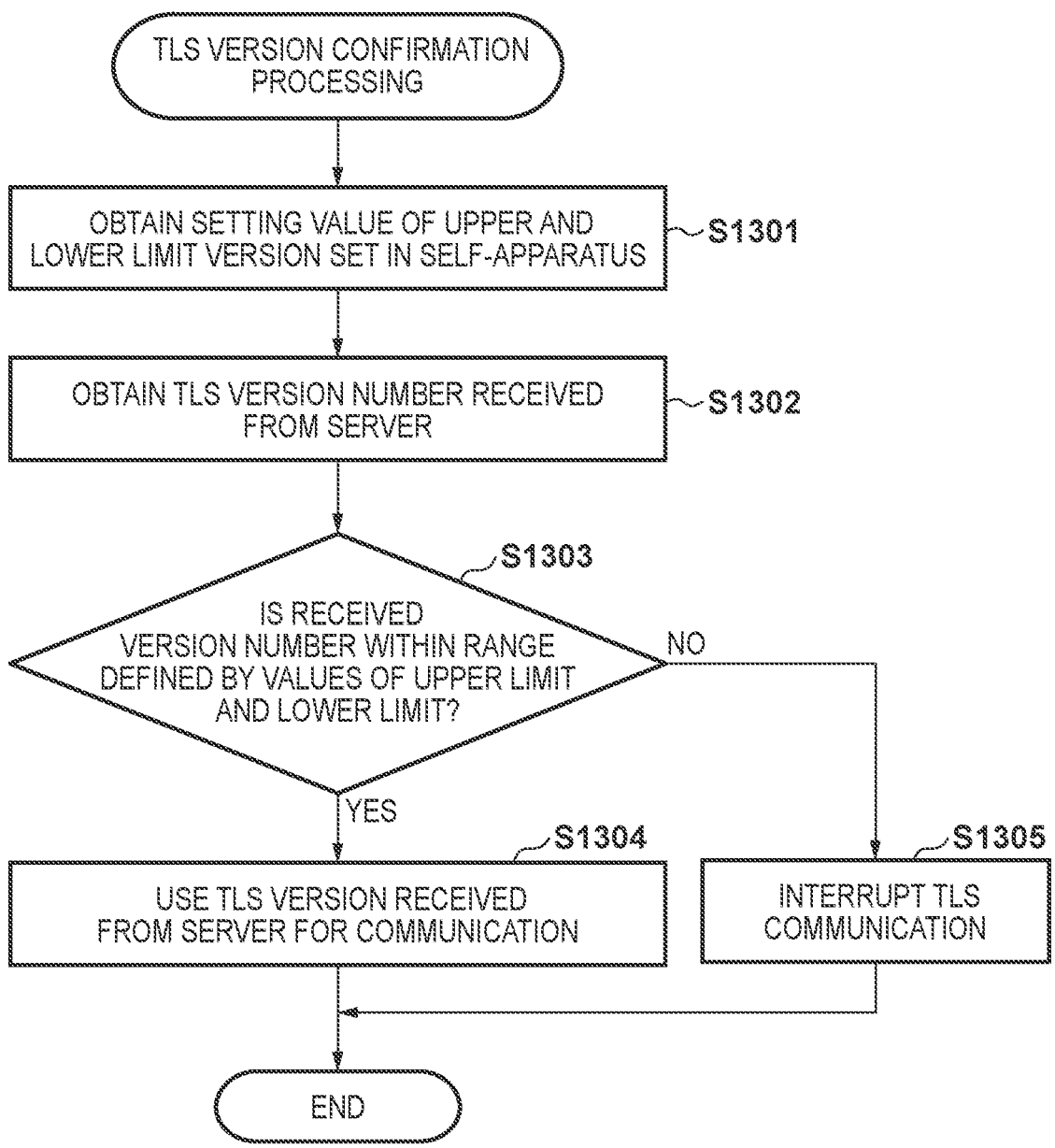
FIG. 13 is a flowchart for describing a procedure for TLS version confirmation processing performed by the MFP according to the embodiment.

FIG. 13 is a flowchart for describing a procedure for TLS version confirmation processing performed by the MFP 101 according to the embodiment. Processing illustrated in this flowchart is realized by the CPU 201 of the MFP 101 deploying, on the RAM 203, and executing the program stored in the storage unit such as the HDD 204 or the ROM 202.

First of all, in step S1301, the CPU 201 functions as the communication settings control module 308, and obtains the TLS upper and lower limit version information set in the MFP 101. Then, the processing proceeds to step S1302, where the CPU 201 functions as the communication settings control module 308 to obtain the TLS version number desired to be used by a server that is the communication partner and received from the server. Then, the processing proceeds to step S1303, where the CPU 201 functions as the communication settings control module 308 to determine whether the TLS version number desired to be used by the server is within the range defined by the values of the upper and the lower limit versions of the MFP 101. When the value is determined to be within the range, the processing proceeds to step S1304 where the CPU 201 functions as the communication settings control module 308, to determine to employ the TLS version number received from the server for the encryption communications, and then terminates this processing. On the other hand, when the TLS version number desired to be used by the server is determined to be outside the range defined by the upper and the lower limits of the MFP 101 in step S1303, the processing proceeds to step S1305 where the CPU 201 interrupts the communication with the server that is the communication destination, and terminates this processing.

While in the description of the embodiment, in FIG. 9A, the host name (name) or the IP address is used as the identification information for the specific server, the same effect can be obtained with each button, displayed on the home screen in FIG. 4, used as the identification information. Not only one but also a plurality of pieces of identification information may be set to be registerable for the specific server.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-76556, filed Apr. 28, 2021, which is hereby incorporated by reference herein in its entirety.

What is claimed is:

1. An information processing apparatus configured to perform encryption communication with a communication destination using an encryption communication protocol, the information processing apparatus comprising,
  one or more controllers including at least one processor and at least one memory, the one or more controllers configured to:
    register, based on a user instruction, a first version of the encryption communication protocol and register, based on the user instruction, a second version of the encryption communication protocol in association with a specific communication destination, wherein the first version is different from the second version or the first version is newer than the second version;
    receive information indicating a version of the encryption communication protocol to be used for the encryption communications from the communication destination, wherein the received information is configured to indicate the first version and the second version;
    in a case that the received information indicates the first version, execute a communication using the encryption communication protocol of the first version with the communication destination; or
    in a case that the received information indicates the second version and the communication destination from which the information is received is not the specific communication destination, not execute the communication using the encryption communication protocol with the communication destination; or
    in a case that the received information indicates the second version and the communication destination from which the information is received is the specific communication destination, execute the communication using the encryption communication protocol of the second version with the specific communication destination.

2. The information processing apparatus according to claim 1, wherein the one or more controllers are further configured to:
  register the second version of the encryption communication protocol in association with identification information of the specific communication destination.

3. The information processing apparatus according to claim 2, wherein the identification information is a name or an IP address of the specific communication destination.

4. The information processing apparatus according to claim 1, wherein the version of the encryption communication protocol is registered by selection, by the user, of the version from a displayed list of versions of the encryption communication protocol.

5. The information processing apparatus according to claim 1, wherein the one or more controllers are further configured to:
  display, in a case that the version indicated by the received information is not included in the registered version of the encryption communication protocol, information indicating a communication error.

6. The information processing apparatus according to claim 1, wherein the second version registered in association with the specific communication destination includes a plurality of versions.

7. The information processing apparatus according to claim 1, wherein the first version of the encryption communication protocol is registered based on an upper limit value and a lower limit value.

8. The information processing apparatus according to claim 1, wherein the communication destination is a web server.

9. The information processing apparatus according to claim 1, wherein the encryption communication protocol includes at least any of Transport Layer Security (TLS), secure Sockets Layer (SSL), Security Architecture for the Internet Protocol (IPSec), and IEEE802.1X.

10. A method of controlling an information processing apparatus configured to perform encryption communications with a communication destination, the method comprising:
  registering, based on a user instruction, a first version of the encryption communication protocol and registering, based on the user instruction, a second version of the encryption communication protocol in association with a specific communication destination, wherein the first version is different from the second version or the first version is newer than the second version;
  receiving information indicating a version of the encryption communication protocol to be used for the encryption communications from the communication destination, wherein the received information is configured to indicate the first version and the second version;
  in a case that the received information indicates the first version, executing a communication using the encryption communication protocol of the first version with the communication destination; or
  in a case that the received information indicates the second version and the communication destination from which the information is received is not the specific communication destination, not executing the communication using the encryption communication protocol with the communication destination; or
  a case that the received information indicates the second version and the communication destination from which the information is received is the specific communication destination, executing the communication using the encryption communication protocol of the second version with the specific communication destination.

11. A non-transitory computer-readable storage medium storing a program for causing a processor to execute a method of controlling an information processing apparatus configured to perform encryption communications using an encryption communication protocol set as a used protocol from among a plurality of encryption communication protocols, the method comprising:
  registering, based on a user instruction, a first version of the encryption communication protocol and registering, based on the user instruction, a second version of the encryption communication protocol in association with a specific communication destination, wherein the first version is different from the second version or the first version is newer than the second version;
  receiving information indicating a version of the encryption communication protocol to be used for the encryption communications from the communication destination, wherein the received information is configured to indicate the first version and the second version;
  in a case that the received information indicates the first version, executing a communication using the encryption communication protocol of the first version with the communication destination; or
  in a case that the received information indicates the second version and the communication destination from which the information is received is not the specific communication destination, not executing the communication using the encryption communication protocol with the communication destination; or
  a case that the received information indicates the second version and the communication destination from which the information is received is the specific communication destination, executing the communication using the encryption communication protocol of the second version with the specific communication destination.

* * * * *